United States Patent Office 3,557,035
Patented Jan. 19, 1971

3,557,035
HEAT-CURABLE EPOXIDE RESIN
COMPOSITIONS
Rolf Schmid, Reinach, Basel-Land, Friedrich Lohse, Allschwil, Willy Fisch, Binningen, and Hans Batzer, Arlesheim, Switzerland, assignors to Ciba Limited, Basel, Switzerland, a company of Switzerland
No Drawing. Filed Jan. 19, 1970, Ser. No. 4,085
Claims priority, application Switzerland, Jan. 24, 1969, 1,106/69
Int. Cl. C08g *17/16, 30/12*
U.S. Cl. 260—22
19 Claims

ABSTRACT OF THE DISCLOSURE

Heat-curable epoxide resin mixtures of (1) a cycloaliphatic polyglycidyl compound which possesses at least one alicyclic five-membered or six-membered ring, (2) a polycarboxylic acid anhydride (0.2–1.1 anhydride groups per 1 equivalent of epoxide groups) and (3) a polyester containing terminal carboxyl groups and/or hydroxyl groups, which is obtained by esterification of aliphatic-cycloaliphatic higher dicarboxylic acids (manufactured by dimerization of unsaturated monomeric fatty acid with 14–24 carbon atoms in the molecule, perferably 16–18, and optionally subsequent hydrogenation of such a dimeric fatty acid) with aliphatic diols (0.02–0.4 mol of polyester per 1 equivalent of epoxide groups). The curing of the mixtures yields flexible, impact-resistant mouldings the physical properties of which show little temperature-dependence, and which possess high flexibility at low temperatures.

It is known that polyepoxide compounds can be cured with carboxylic acid anhydrides to give moulded materials which are distinguished by high mechanical strength, heat resistance and dielectric strength. For many applications, the relatively low flexibility of such moulded materials however proves to be inadequate. It is known that the flexibility can be increased by adding plasticizers, such as polyethylene glycol, polypropylene glycol or polyesters having terminal carboxyl groups and/or hydroxyl groups. Cured products which in part have a significantly higher deflection and elongation at break are obtained in this way. These known flexible moulded materials however suffer from some serious disadvantages: the mechanical values and the dielectric values are very poor. The values decline even after a slight temperature rise and in a moist atmosphere the mouldings rapidly take up major amounts of water even at room temperature, whereby the dielectric properties also deteriorate; even the moulded materials which are still very flexible at room temperature rapidly show embrittlement at lower temperatures.

It is furthermore known from Swiss Pat. 441,752 to obtain mouldings with relatively good dielectric properties by reaction of acid polyesters of dimerized fatty acid and ε-caprolactone with epoxide resins. The physical properties of the formulations mentioned, and in particular the mechanical strength values of such mouldings, are however still very temperature-dependent. At slightly elevated temperature the mouldings manufactured have very low mechanical strength and high dielectric losses.

It has now been found that by reaction of certain cycloaliphatic polyglycidyl compounds with polyesters of special structure derived from dimerized fatty acids and with polycarboxylic acid anhydrides in certain stoichiometric quantity ratios, flexible impact-resistant mouldings are obtained which surprisingly do not exhibit the abovementioned disadvantages of the flexible moulded materials hitherto known or show them to a greatly reduced extent; in particular, the new moulded materials show a low temperature dependence of the physical properties and high flexibility at low temperatures (down to −40° C.). The mixtures in general have a low viscosity and are therefore preferentially suitable for use as impregnating resins, which are furthermore distinguished by a surprisingly long period of use ("pot life") and storage stability at room temperature. In addition to this use as an impregnating resin, the mixtures can also advantageously be used as a casting resin or dipping resin, or as an additive to adhesive and compression moulding compositions.

The polyesters derived from dimerized fatty acids and used for the new curable mixtures must fulfil very particular structural prerequisites.

In the new curable mixtures, 0.02 to 0.4, preferably 0.03 to 0.2, mol of the polyester as well as 0.2 to 1.1 equivalents of anhydride groups of the dicarboxylic or polycarboxylic acid anhydrides employed as curing agents are furthermore used per 1 epoxide equivalent of the polyglycidyl compound.

The subject of the present invention is thus heat-curable, plasticized epoxide resin mixtures, which are suitable for use as casting, impregnating and laminating resins, as adhesives and compression moulding compositions, characterised in that they contain (1) a cycloaliphatic polyepoxide compound which contains at least one alicyclic five-membered or six-membered ring as well as an average of more than one glycidyl group or β-methylglycidyl group bonded to a hetero-atom in the molecule, (2) a polycarboxylic acid anhydride in an amount of 0.2 to 1.1 equivalents of anhydride groups per 1 equivalent of epoxide groups of the polyepoxide compound (1) and (3) a long-chain polyester of formula (I)  $\quad X_1—A—X_2$ in an amount of 0.02 to 0.4, preferably 0.03 to 0.2, mol per 1 equivalent of epoxide group of the polyepoxide compound (1), with $X_1$ and $X_2$ in Formula I each denoting a carboxyl group or a hydroxyl group, and with A denoting the residue of a polyester, which has been obtained by polycondensation of an unsaturated or saturated aliphatic-cycloaliphatic higher dicarboxylic acid, which has been manufactured by dimerization of unsaturated monomeric fatty acid with 14 to 24 carbon atoms in the molecule, preferably 16 to 18 carbon atoms, and optional subsequent hydrogenation of such a dimeric fatty acid, with an aliphatic, branched-chain or straight chain diol, with the proviso that the average molecular weight of the polyester lies between about 1100 and about 8000.

As polyglycidyl compounds of the nature indicated above, containing alicyclic rings and having an average of more than one glycidyl group or β-methylglycidyl group bonded to a hetero-atom (for example sulphur or nitrogen, preferably oxygen), the following may be mentioned in particular: diglycidyl ethers or polyglycidyl ethers of polyhydric cycloaliphatic alcohols such as for example 1,1-bis-(hydroxylmethyl) - cyclohexene - 3, 1,1-bis-(hydroxymethyl) - cyclohexane, 1,4 - bis - (hydroxymethyl) - cyclohexane, cis- and trans-quinitol, 2,2 - bis-(4′-hydroxycyclohexyl - propane (=hydrogenated diomethane); diglycidyl and polyglycidyl esters of cycloaliphatic polybasic carboxylic acids, such as Δ⁴-tetrahydrophthalic acid, 4-methyl-Δ⁴-tetrahydrophthalic acid, hexahydrophthalic acid, 4-methylhexahydrophthalic acid, 3,6-endomethylene-Δ⁴-tetrahydrophthalic acid, methyl-3,6-endomethylene-Δ⁴-tetrahydrophthalic acid; furthermore, the corresponding poly-(β-methylglycidyl)-ethers and poly-(β-methylglycidyl)-esters of the abovementioned polyhydric alicyclic alcohols or polybasic alicyclic polycarboxylic acids.

Of course mixtures of the polyglycidyl compounds quoted above can also be used.

The polyglycidyl ethers or polyglycidyl esters derived from cycloaliphatic polyols or cycloaliphatic polycarboxylic acids are particuarly suitable, since the curable mixtures manufactured therewith are of relatively low viscosity.

The use, which is not claimed here, of aromatic polyepoxide compounds such as the diglycidyl compounds of 2,2-bis-(p-hydroxyphenyl)-propane ("diomethane") admittedly also leads to products of high flexibility, good dielectric properties and low water absorption. These diglycidyl compounds are however mostly incompatible with the polyesters mentioned (demixing).

The polyesters of Formula I used for the manufacture of the new curable mixtures according to the invention can be acid polyesters with two terminal carboxyl groups or with one terminal hydroxyl group. They can also represent polyesters with two terminal hydroxyl groups. Such polyesters are obtained according to known methods by polycondensation of the dicarboxylic acids with the diols. Depending on the chosen molar ratio of dicarboxylic acid to diol and the completeness of the condensation, polyesters of different chain lengths and different distribution of the end groups are obtained. Here the molar ratio and degree of condensation must be so chosen that the average molecular weight of the polyester lies in the range of about 1100 to about 8000.

The aliphatic-cycloaliphatic higher dicarboxylic acids suitable for the manufacture of the polyester are obtainable by dimerisation of monomeric fatty acids having sufficient functional double bonds, or of fatty acids derived from drying or semi-drying oils.

Possible monomeric fatty acids of this nature are those which contain 14 to 24 carbon atoms, preferably 16 to 18 carbon atoms, in the molecule and possess at least one reactive double bond in the molecule, such as for example oleic acid, linoleic acid, linolenic acid, ricinenic acid and also fatty acids containing hydroxyl groups, such as for example ricinoleic acid.

A suitable semi-drying or drying oils from which such fatty acids are derived, there may be mentioned: cottonseed oil, rape oil, safflower oil, sesame oil, sunflower oil, soya oil, tung oil, linseed oil, oiticica oil, perilla oil and the like.

In the known dimerization process for the manufacture of the alphatic-cycloaliphatic dicarboxylic acids the fatty acids which must contain at least one double bond in the molecule largely react to form an acid mixture which mainly consists of dimeric constituents and to a lesser extent also trimeric or higher molecular constituents. The monomeric insufficiently functional acids are removed from the reaction mixture by distillation.

The aliphatic-cycloaliphatic dicarboxylic acids obtained by polymerization, which are unsaturated to a certain degree, can be used for the manufacture of the polyesters directly or after subsequently carried-out hydrogenation.

As aliphatic diols for the manufacture of the polyesters, the following compounds are preferably used: ethylene glycol, diethylene glycol, 1,2-propanediol (propylene glycol), 1,3-propanediol (trimethylene glycol), dipropylene glycol, 1,4-butanediol, 1,3-butanediol, 2,3-butanediol, 1,5-pentanediol, neopentyl glycol, 1,6-hexanediol, 1,7-heptanediol, 1,8-octanediol, 1,9-nonanediol, 1,10-decanediol, 1,11-undecanediol, 1,12-dodecanediol, 1,6-dihydroxy-2,2,4-trimethylhexane and 1,6-dihydroxy-2,4,4-trimethylhexane.

It is also possible, when manufacturing the polyesters (I), additionally to employ smaller proportions of trivalent or polyvalent components, such as for example hexanetriol or trimerized fatty acid, tricarboxylic or tetracarboxylic acid or their anhydrides, such as trimellitic acid anhydride or pyromellitic acid anhydride. The curable mixtures, which as component (3) contain polyester mixtures manufactured in this way, which in addition to polyesters of Formula I further contain proportions of more strongly branched-chain polyesters with more than two terminal carboxyl groups, however yield moulded materials with analogous physical properties after cure, so that in most cases no further advantages any longer manifest themselves as a result of this measure.

For the manufacture of acid polyesters with predominantly terminal carboxyl groups, a molar ratio of dicarboxylic acid to diol greater than 1 is chosen. If conversely, the molar ratio of dicarboxylic acid to diol is chosen to be less than 1, polyesters are obtained which predominantly contain hydroxyls as terminal groups.

The acid polyesters used according to the invention preferably as a rule correspond to the formula (II) 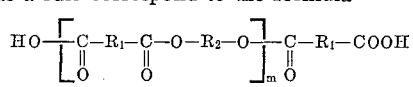

wherein $R_1$ denotes the hydrocarbon residue of an unsaturated or saturated aliphatic-cycloaliphatic higher dicarboxylic acid which has been manufactured by dimerization of unsaturated monomeric fatty acids with 14 to 24 carbon atoms in the molecule, preferably 16 to 18 carbon atoms, and optional subsequent hydrogenation of such a dimeric fatty acid, $R_2$ denotes a residue of an aliphatic diol obtained by separating off the two hydroxyl groups, and $m$ denotes an integer from 1 to 20, preferably from 2 to 6.

The polyesters with terminal hydroxyl groups which can also be used in accordance with the invention, preferably as a rule correspond to the formula (III) 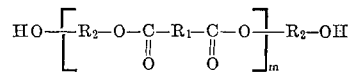

wherein the symbols $R_1$, $R_2$ and $m$ possess the same significance as in Formula II.

It is however also possible to use polyesters with terminal carboxyl groups and/or hydroxyl groups, which are manufactured by condensation of the dicarboxylic acid defined above with a mixture of two or more diols, or conversely by condensation of a diol with a mixture of two or more of the dicarboxylic acids defined above in the correct mutual stoichiometric quantity ratio. Naturally, acid polyesters can also be manufactured by condensation of mixtures of different dicarboxylic acids with mixtures of different diols.

As polycarboxylic acid anhydrides (2) compounds of the following formula are preferably used:

(IV) 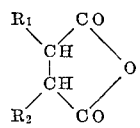

wherein $R_1$ and $R_2$ each denote a hydrogen atom, an alkyl residue or alkenyl residue, with $R_1$ and/or $R_2$ preferably representing alkyl or alkenyl, or wherein $R_1$ and $R_2$ together denote a divalent residue which is necessary for completing a carbocyclic ring.

Such preferentially used curing agents are for example cycloaliphatic polycarboxylic acid anhydrides, such as $\Delta^4$-tetrahydrophthalic anhydride, 4-methyl-$\Delta^4$-tetrahydrophthalic anhydride, hexahydrophthalic anhydride, 4-methyl-hexahydrophthalic anhydride, 3,6-endomethylene-$\Delta^4$-tetrahydrophthalic anhydride, 4-methyl-3,6-endomethylene-$\Delta^4$-tetrahydrophthalic anhydride (=methylnadic anhydride) and the Diels-Alder adduct of 2 mols of maleic anhydride and 1 mol of 1,4-bis-(cyclopentadienyl)-2-butene.

Dodecenylsuccinic anhydride or mixtures of dodecenylsuccinic anhydride with one or more of the polycarboxylic acid anhydrides mentioned have proved particularly advantageous, since on addition of dodecenylsuccinic anhydride the compatibility (solubility of the various components) is increased and the viscosity of the mixture is lowered.

The term "curing" as used here, denotes the conversion of the above mixtures into insoluble and infusible, crosslinked products, and in particular as a rule with simultaneous shaping to give mouldings such as castings, pressings or laminates, or to give two-dimensional structures, such as lacquer films or adhesive bonds.

The curable mixtures according to the invention can be mixed with fillers and reinforcing agents, pigments, dyestuffs, flameproofing substances or mould release agents in any stage before curing.

As fillers and reinforcing agents, glass fibres, boron fibres, carbon fibres, mica, quartz powder, aluminium oxide trihydrate, gypsum, burnt kaolin or metal powders, such as aluminium powder, can for example be used.

The curable mixtures can, in the unfilled or filled state, especially serve as laminating resins, dipping resins, impregnating resins, casting resins or potting compositions and insulating compositons for the electrical industry.

The mixtures are for example particularly suitable for impregnating coils wrapped with glass fabrics and/or mica.

They can furthermore be successfully employed for all other industrial fields where usual epoxide resins are employed, for example as binders, adhesives, paints, lacquers, compression moulding compositions and sintering powders.

In the examples which follow, percentages denote percentages by weight.

The following polyesters were used for the manufacture of the curable mixtures described in the examples:

(a) MANUFACTURE OF THE DIMERIZED FATTY ACID

Manufacture of dimerized recinenic acid 1850.7 g. (6.20 mols) of ricinoleic acid are heated for 20 hours to 175–180° C. with 9 g. of potassium bisulphate in a sulphonation flask equipped with a stirrer, thermometer and descending condenser, and the water eliminated is continuously distilled off. The reaction mixture is then distilled, whereupon 1411 g. of a light yellow oily product are obtained at 184° C./0.15 mm. Hg to 193° C./0.25 mm. Hg, which on the basis of mass spectra consists of a mixture of carboxylic acids of molecular weight 280, 282 and 284. From hydrogenation experiments one is forced to the conclusion that the product contains significant proportions of ricinenic acid. 9.074 mg. of substance consume 1.67 ml. of hydrogen (reduced volume).

The 1411 g. of product, containing diolefinic fatty acids, distilled above were allowed to react for 15 hours at 260° C. under a nitrogen atmosphere in an autoclave, and subsequently the constituents which could be distilled up to 190° C./0.07 mm. Hg were removed. 855.9 g. of a dimerized ricinenic acid which was red brown in colour, having an acid equivalent weight of 281, were thereby obtained.

(b) MANUFACTURE OF POLYESTERS

Polyester A 291.9 g. (0.52 mol) of the dimerized ricinenic acid manufactured above under (a) are mixed with 36.8 g. (0.35 mol) of diethylene glycol in a sulphonation flask equipped with a stirrer, thermometer and descending condenser, and warmed under a nitrogen atmosphere over the course of 6 hours from 135° C. to 166° C., with the water eliminated being continuously distilled off. Thereafter the mixture was warmed for 1 hour under 12 mm. Hg in order to remove the last remnants of water. A viscous polyester of dark brown color was obtained, having an acid equivalent weight of 1190. (Theoretical acid equivalent weight: 911.)

Polyester B 2288 g. of a dibasic acid manufactured by dimerization of oleic acid, having an average of 36 carbon atoms and an acid equivalent weight of 286 (obtainable from Emery Industries under the registered trade name Empol 1014) were warmed to 150° C. with 630 g. of hexanediol-(1,6) (corresponding to a ratio of 4 mols of hexanediol to 3 mols of dimerized fatty acid) and further warmed to 162° C. over the course of 5 hours in a nitrogen atmosphere, while stirring. Thereafter a vacuum of 15 mm. Hg was applied for 1 hour. The reaction product was a light yellow liquid with a predominant proportion of hydroxyl groups; (acid equivalent weight=4650).

Polyester C 1145 g. of dimerized fatty acid (Empol 1014) having an acid equivalent wegiht of 286 were warmed to 138° C. with 156 g. of neopentyl glycol (corresponding to a ratio of 4 mols of dimerized fatty acid to 3 mols of neopentyl glycol) under a nitrogen atmosphere. The mixture was further warmed to 188° C. over the course of 6 hours while stirring. Thereafter the reaction product was cooled to 132° C., subjected to a vacuum of 12 mm. Hg, and warmed to 178° C. over the course of 1¼ hours. The acid polyester thus obtained was a viscous, yellow liquid having an acid equivalent weight of 1210 (theory: 1246).

Polyester D 3430 g. of dimerized fatty acid (Empol 1014) were warmed to 166° C. with 531 g. of hexanediol-(1,6) (corresponding to 3 mols of glycol to 4 mols of dimerized fatty acid). The mixture was warmed to 197° C. over the course of 5½ hours under a nitrogen atmosphere and while stirring, and the water produced by the polycondensation was distilled off. Thereafter the mixture was cooled to 150° C., subjected to a vacuum of 17 mm. Hg, and warmed to 172° C. over the course of ½ an hour. The resulting polyester was a yellow liquid of medium viscosity, having an acid equivalent weight of 1215 (theory: 1267).

Polyester E 1144 g. of dimerized fatty acid (Empol 1014) were warmed to 134° C. with 135 g. of butanediol-(1,4) (corresponding to 3 mols of glycol per 4 mols of dimerized fatty acid). The mixture was further warmed to 180° C. over the course of 7½ hours under a nitrogen atmosphere and, while stirring, and the water produced by the polycondensation was continuously distilled off. Thereafter the mixture was cooled to 170° C., subjected to a vacuum of 15 mm. Hg, and again warmed to 180° C. over the course of ½ hour. The resulting polyester was a yellow liquid of medium viscosity, having an acid equivalent weight of 1029 (theory: 1225).

Polyester F 1168 g. of a polycarboxylic acid manufactured by dimerization of unsaturated fatty acids, having an acid equivalent weight of 292 (containing 75% of dimerized acid and 24% of trimerized acid, registered trade name Empol 1024) were warmed to 147° C. with 93 g. of ethylene glycol (corresponding to 3 equivalents of hydroxy group per 4 equivalents of carboxyl group). The mixture was further warmed to 191° C. over the course of 6 hours under a nitrogen atmosphere and while stirring, and the water produced by the polycondensation reaction was continuously distilled off. Thereafter the mixture was cooled to 152° C., subjected to a vacuum of 11 mm. Hg and warmed to 200° C. over the course of 1¼ hours, under this vacuum. The resulting polyester was a viscous yellow liquid having an acid equivalent weight of 1057 (theory: 1207).

Polyester G 1716 g. of dimerized fatty acid (Empol 1014) were warmed to 165° C. with 265 g. of diethylene glycol (corresponding to a ratio of 6 mols of glycol to 7 mols of dimerized fatty acid). The mixture was further warmed to 218° C. over the course of 4 hours under a nitrogen atmosphere and while stirring, and the water produced by the polycondensation was continuously distilled off. Thereafter the reaction product was cooled to 160° C., slowly warmed to 218° C. over the course of 10 hours, and left at this temperature for 4½ hours. The resulting polyester had an acid equivalent weight of 1918 (theory: 1886).

Polyester H 1258 g. of dimerized fatty acid (Empol 1014) were warmed to 118° C. with 236 g. of hexanediol-(1,6) (corresponding to a ratio of 10 mols of glycol to 11 mols of dimerized fatty acid) and further warmed to 204° C. over the course of 2 hours under a nitrogen atmosphere and while stirring, with the water produced by the polycondensation being continuously distilled off. Thereafter the reaction product was stirred for 2 hours at this temperature and cooled to 160° C. After applying a vacuum of 20 mm. Hg, the reaction product was again warmed to 192° C. over the course of 1 hour, subsequently to 198° C. over the course of a further hour, and to 216° C. over the course of a further 9 hours. The polyester thus obtained was a viscous liquid having an acid equivalent weight of 3200 (theory=3556).

Polyester J 391 g. of dimerized fatty acid (Empol 1014) were warmed to 163° C. with 68.7 g. of diethylene glycol (corresponding to a ratio of 18 mols of glycol to 19 mols of dimerized fatty acid). The mixture was warmed to 200° C. over the course of 9 hours under a nitrogen atmosphere and while stirring, and the water produced by the polycondensation was continuously distilled off. Thereafter the reaction product was cooled to 168° C., slowly warmed to 220° C. over the course of 20 hours under a vacuum of 15 mm. Hg, and left at this temperature for 7 hours. The polyester thus obtained was a viscous liquid having an acid equivalent weight of 5160 (theory=6070).

PROCESSING EXAMPLES

Example 1

100 g. of hexahydrophthalic acid diglycidyl ester having an epoxide content of 6.3 epoxide equivalents/kg. (=epoxide resin I) were warmed to 80° C. with 70 g. of polyester A and 152 g. of dodecenylsuccinic anhydride (corresponding to 0.571 mol of anhydride and 0.059 equivalent of carboxyl group of the acid polyester per 0.63 equivalent of epoxide group). After adding 0.2 g. of 1-methylimidazole, the mixture was well stirred, subjected to a vacuum to remove air bubbles, and poured into aluminium moulds prewarmed to 80° C. and treated with a silicone release agent, sheets of 135 x 135 x 4 mm. being manufactured for determining the flexural strength, deflection, impact strength and water absorption, and the same sheets but at a thickness of 3 mm. for measuring the dielectric loss factor tg δ. The test specimens for the flexural test and impact test were machined from the sheets, whilst for the tensile test the appropriate test specimens according to DIN 16,946 or DIN 53,455, sample shape 2 (4 mm.) or VSM 77,101, FIG. 2 (4 mm. thick sample rod) were manufactured directly. After a heat treatment for 16 hours at 140° C., the following properties were measured on the mouldings:

Flexural strength according to VSM 77,103=2.75 kg./mm.$^2$
Deflection according to VSM 77,103=>20 mm.
Impact strength according to VSM 77,105=>25 cm. kg./cm.$^2$
Water absorption after 24 hours, 20° C.=0.13%
Tensile strength according to VSM 77,101, revised (test specimens 4 mm.; testing speed 50 mm./min.)=2.4 kg./mm.$^2$
Elongation at break according to VSM 77,101, revised =21%
Dielectric loss factor tg δ (50 Hz.) at 20° C.=0.01
Tracking resistance according to VDE 0303=KA3c (level)
Arcing resistance DIN 53,484=L4 (level)

Example 2

(a) 100 g. of epoxide resin I were warmed to 80° C. with 70 g. of Polyester B, 85 g. of docecenylsuccinic anhydride and 55 g. of methylnadic anhydride (corresponding to 0.63 mol of anhydride per 0.63 equivalent of epoxide group). After adding 0.2 g. of 1-methyl-imidazole, the mixture was well stirred, subjected to a brief vacuum treatment and poured into the moulds according to Example 1. After a heat treatment of 16 hours at 140° C. moulding with the following properties were obtained:

Flexural strength according to VSM 77,103=2.2 kg./mm.$^2$
Deflection=>20 mm.
Impact strength according to VSM 77,105=>24 cm. kg./cm.$^2$
Water absorption after 24 hours, 20° C.=0.11%
Tensile strength according to VSM 77,101=1.7 kg./mm.$^2$
Elongation at break according to VSM 77,101=9%
Dielectric loss factor tg δ (50 Hz.) at 20° C.=0.01
Tracking resistance VDE 0303=KA3c
Arcing resistance DIN 53,484=L4

(b) When using 168 g. of dodecenylsuccinic anhydride (DBA) instead of a mixture of 85 g. of DBA and 55 g. of methylnadic anhydride, and otherwise the same composition and processing as in Example 2(a), mouldings with the following properties were obtained:

Flexural strength according to VSM 77,103=2.6 mg./mm.$^2$
Deflection according to VSM 77,103=>20 mm.
Impact strength VSM 77,105=>25 cm. kg./cm.$^2$
Water absorption after 24 hours, 20° C.=0.10%
Tensile strength according to VSM 77,101=2.0 kg./mm.$^2$
Elongation at break according to VSM 77,101=15%
Dielectric loss factor tg δ (50 Hz.) at 20° C.=0.01; at 90° C.=0.05

(c) When using 112 g. of dodecenylsuccinic anhydride and 37.4 g. of methynadic anhydride and otherwise the same composition and processing as in Example 2(a), mouldings with the following properties were obtained:

Flexural strength according to VSM 77,103=3.2 kg./mm.$^2$
Deflection according to VSM 77,103=>20 mm.
Impact strength VSM 77,105=>25 cm. kg./cm.$^2$
Water absorption after 24 hours, 20° C.=0.12%
Tensile strength according to VSM 77,101=2.5 kg./mm.$^2$
Elongation at break according to VSM 77,101=19%
Dielectric loss factor tg δ (50 Hz.) at 20° C.=0.01

The curable mixture had a viscosity of 1500 cp. (measured with a Brookfield viscometer, 10 revolutions per minute) at 25° C.

Example 3

100 g. of 2,2 - bis(4' - glycidyloxycyclohexyl - propane (=diglycidyl ether of hydrogenated diomethane) with an epoxide content of 4.5 epoxide equivalents per kg. (=epoxide resin II) were warmed to 100° C. with 70 g. of polyester B and 166 g. of dodecenylsuccinic anhydride. After adding 0.2 g. of 1-methyl-imidazole the mixture was well stirred, subjected to a vacuum to remove the air bubbles, and poured into the moulds according to Example 1. After a heat treatment of 16 hours at 140° C., the following properties were measured on the mouldings:

Flexural strength according to VSM 77,103=0.4 kg./mm.$^2$
Deflection according to VSM 77,103=>20 mm.
Impact strength=>25 cm. kg./cm.$^2$
Water absorption after 24 hours, 20° C.=0.16%
Tensile strength according to VSM 77,101=0.80 kg./mm.$^2$
Elongation at break according to VSM 77,101=71%
Dielectric loss factor tg δ (50 Hz.) at 20° C.=0.022; at 50° C.=0.055; at 75° C.=0.045

Example 4

100 g. of epoxide resin I were warmed to 80° C. with 70 g. of polyester C and 150 g. of dodecenylsuccinic anhydride (corresponding to 0.561 mol of anhydride and 0.057 equivalent of carboxyl group per 0.630 equivalent of epoxide group). After adding 0.2 g. of 1-methylimidazole the whole was well mixed and subjected to a vacuum, and the mixture was poured into prewarmed moulds according to Example 1. After a heat treatment of 16 hours at 140° C., mouldings with the following properties were ogtained:

Flexural strength according to VSM 77,103=3.4 kg./mm.$^2$
Deflection according to VSM 77,103=>20 mm.
Impact strength =>25 cm. kg./cm.$^2$
Water absorption after 24 hours, 20° C.=0.11%
Tensile strength according to VSM 77,101=2.0 kg./mm.$^2$
Elongation at break according to VSM 77,101=20%
Dielectric loss factor tg δ (50 Hz.) at 20° C.=0.010; at 50° C.=0.055; at 90° C.=0.031
Tracking resistance VDE 0303=KA3c (level)
Arcing resistance DIN 53,484=L4 (level)

Example 5

159 g. of epoxide resin I were warmed to 100° C. with 245 g. of polyester D and 116 g. of hexahydrophthalic anhydride (corresponding to 0.75 mol of anhydride and 0.2 equivalent of carboxyl group per 1.0 equivalent of epoxide group). After adding 0.16 g. of N,N-dimethylbenzylamine the whole was well mixed and subjected to a vacuum, and the mixture was poured into the moulds according to Example 1. After a heat treatment of 16 hours at 140° C., mouldings with the following properties were obtained:

Water absorption after 24 hours at 20° C.=0.14%
Tensile strength according to VSM 77,101=0.72 kg./mm.$^2$
Elongation at break according to VSM 77,101=48%
Dielectric loss factor tg δ (50 Hz.) at 20° C.=0.022; at 60° C.=0.028

Example 6

160 g. of 1,1-bis-(glycidyloxymethyl) - cyclohexene-3 (=diglycidyl ether of Δ$^3$-cyclohexene-1,1 - dimethanol) having an epoxide content of 6.25 epoxide equivalents per kg. (=epoxide resin III) were warmed to 100° C. with 206 g. of polyester E and 116 g. of hexahydrophthalic anhydride (corresponding to 0.75 equivalent of anhydride and 0.2 equivalent of carboxyl group per 1.0 equivalent of epoxide group). After adding 0.16 g. of 2-ethyl-4-methylimidazole the whole was well mixed and subjected to a vacuum, and the mixture was poured into the prewarmed moulds according to Example 1. After a heat treatment of 16 hours at 140° C., mouldings with the following properties were obtained:

Water obsorption after 24 hours at 20° C.=0.19%
Tensile strength according to VSM 77,101=0.38 kg./mm.$^2$
Elongation at break according to VSM 77,101=63%

Example 7

222 g. of epoxide resin II were warmed to 100° C. with 211 g. of polyester F and 124 g. of isomerized 4-methyl-Δ$^4$-tetrahydrophthalic anhydride (manufactured by isomerisation of 4-methyl-Δ$^4$-tetahyrdrophthalic anhydride at about 100 to 225° C. in the presence of a palladium catalyst) (corresponding to 0.75 mol of anhydride and 0.2 equivalent of carboxyl group per 1.0 equivalent of epoxide group). After adding 2.2 g. of a 6% strength solution of the sodium alcoholate of 3-hydroxymethyl-2,4 - dihydroxypentane in 3 - hydroxymethyl - 2,4 - dihydroxypentane, the whole was well mixed and subjected to a vacuum, and the mixture was poured into the prewarmed moulds according to Example 1. After a heat treatment of 16 hours at 140° C., mouldings with the following properties were obtained:

Water absorption after 24 hours at 20° C.=0.18%
Tensile strength according to VSM 77,101=0.28 kg./mm.$^2$
Elongation at break according to VSM 77,101=161%.

Example 8

100 g. of hexahydrophthalic acid di-(β-methylglycidyl ester) having an epoxide content of 6.16 epoxide equivalents/kg. (=epoxide resin IV) were warmed to 110° C. with 80 g. of polyester F and 137 g. of dodecenylsuccinic anhydride (corresponding to 0.875 equivalent of anhydride and 0.125 equivalent of carboxyl group of the polyester per 1.0 equivalent of epoxide group). After adding 0.3 g. of methylimidazole the whole was well mixed and subjected to a vacuum, and the mixture poured into the moulds according to Example 1. After a heat treatment of 6 hours at 160° C., mouldings with the following properties were obtained:

Dielectric loss factor tg δ (50 Hz.) at 20° C.=0.040; at 70° C.=0.072

Example 9

100 g. of epoxide resin I were warmed to 100° C. with 80 g. of polyester G and 150 g. of dodecenylsuccinic anhydride (corresponding to 0.935 equivalent of anhydride and 0.065 equivalent of carboxyl group of the polyester per 1.0 equivalent of epoxide groups). After adding 0.3 g. of methylimidazole the whole was well mixed and subjected to a vacuum, and the mixture was poured into the moulds according to Example 1. After a heat treatment of 6 hours at 160° C., mouldings with the following properties were obtained:

Tensile strength according to VSM 77,101=1.35 kg./mm.$^2$
Elongation at break according to VSM 77,101=59%

Example 10

100 g. of epoxide resin I were warmed to 120° C. with 80 g. of polyester H and 154 g. of dodecenylsuccinic anhydride (corresponding to 0.96 equivalent of anhydride and 0.04 equivalent of carboxyl group of the polyester per 1.0 equivalent of epoxide group). After adding 0.3 g. of methylimidazole the whole was well mixed and briefly subjected to a vacuum, and the mixture was poured into the moulds according to Example 1. After a heat treatment of 6 hours at 160° C., mouldings with the following properties were obtained:

Tensile strength according to VSM 77,101=0.85 kg./mm.$^2$
Elongation at break according to VSM 77,101=5%
Dielectric loss factor tg δ (50 Hz.) at 20° C.=0.006; 50° C.=0.012; 80° C.=0.078

Example 11

100 g. of epoxide resin I were warmed to 120° C. with 80 g. of polyester J and 157 g. of dodecenylsuccinic anhydride (corresponding to 0.975 equivalent of anhydride and 0.025 equivalent of carboxyl group of the polyester per 1.0 equivalent of epoxide group). After adding 0.3 g. of methylimidazole the whole was well mixed and subjected to a vacuum, and the mixture was poured into the moulds according to Example 1. After a heat treatment of 6 hours at 160° C., mouldings with the following properties were obtained:

Tensile strength according to VSM 77,101=0.54 kg./mm.²
Elongation at break according to VSM 77,101=4%
Dielectric loss factor tg δ (50 Hz.) at 20° C.=0.008; 50° C.=0.022

What is claimed is:

1. A heat-curable composition of matter comprising (1) a cycloaliphatic polyepoxide which possesses at least one alicyclic five-membered or six-membered ring as well as an average of more than one glycidyl group or β-methylglycidyl group bonded to a hetero-atom in the molecule, (2) a polycarboxylic acid anhydride in an amount of 0.2 to 1.1 equivalent of anhydride groups per 1 equivalent of epoxide groups of the polyepoxide compound (1) and (3) a long-chain polyester of formula (I)          $X_1$—A—$X_2$ in an amount of 0.22 to 0.4 mol per 1 equivalent of epoxide group of the polyepoxide compound (1), wherein, in the Formula I, the symbols $X_1$ and $X_2$ each denote a carboxyl group or a hydroxyl group, and A denotes the residue of the polyester, said polyester having been obtained by polycondensation of a member selected from the group consisting of unsaturated aliphatic-cycloaliphatic dicarboxylic acid which has been manufactured by dimerization of unsaturated monomeric fatty acid having 14 to 24 carbon atoms in the molecule, and saturated aliphatic-cycloaliphatic higher dicarboxylic acid which has been manufactured by dimerization of unsaturated monomeric fatty acid having 14 to 24 carbon atoms in the molecule, and subsequent hydrogenation of such a dimeric fatty acid, with an aliphatic, branched-chain or straight chain diol, with the proviso that the average molecular weight of the polyester lies between about 1100 and about 8000.

2. A heat-curable composition of matter comprising (1) a cycloaliphatic polyepoxide which possesses at least one alicyclic five-membered or six-membered ring as well as an average of more than one glycidyl group or β-methylglycidyl group bonded to a hetero-atom in the molecule, (2) a polycarboxylic acid anhydride in an amount of 0.2 to 1.1 equivalent of anhydride groups per 1 equivalent of epoxide groups of the polyepoxide compound (1) and (3) a long-chain polyester of formula (I)          $X_1$—A—$X_2$ in an amount of 0.03 to 0.2 mol per 1 equivalent of epoxide group of the polyepoxide compound (1), wherein, in the Formula I, the symbols $X_1$ and $X_2$ each denote a carboxyl group or a hydroxyl group, and A denotes the residue of the polyseter, said polyester having been obtained by polycondensation of a member selected from the group consisting of unsaturated aliphatic-cycloaliphatic dicarboxylic acid which has been manufactured by dimerization of unsaturated monomeric fatty acid having 14 to 24 carbon atoms in the molecule, and saturated aliphatic-cycloaliphatic higher dicarboxylic acid which has been manufactured by dimerization of unsaturated monomeric fatty acid having 14 to 24 carbon atoms in the molecule, and subsequent hydrogenation of such a dimeric fatty acid, with an aliphatic, branched-chain or straight chain diol, with the proviso that the average molecular weight of the polyester lies between about 1100 and about 8000.

3. A composition according to claim 1, which contains the polyglycidyl ether of a polyhydric cycloaliphatic alcohol as the polyepoxide compound (1).

4. A composition according to claim 3, which contains the diglycidyl ether of 2,2-bis-(4'-hydroxy-cyclohexyl)-propane as the polyepoxide compound (1).

5. A composition according to claim 3, which contains the diglycidyl ether of Δ³-cyclohexene-1,1-dimethanol as the polyepoxide compound (1).

6. A composition according to claim 1, which contains the polyglycidyl ester of a cycloaliphatic polycarboxylic acid as the polyepoxide compound (1).

7. A composition according to claim 6, which contains the diglycidyl ester of Δ⁴-tetrahydrophthalic acid or hexahydrophthalic acid as the polyepoxide compound (1).

8. A composition according to claim 6, which contains the di-(β-methylglycidyl ester) of hexahydrophthalic acid as the polyepoxide compound (1).

9. A composition according to claim 1, which contains a polyester (3) in which the acid component is dimerized ricinenic acid.

10. A composition according to claim 1, which contains a polyester (3) in which the acid component is dimerized oleic acid.

11. A composition according to claim 1, which contains a polyester (3) in which the alcohol component is ethylene glycol or diethylene glycol.

12. A composition according to claim 1, which contains a polyester (3) in which the alcohol component is propylene glycol-(1,3), butanediol-(1,4) or hexanediol-(1,6).

13. A composition according to claim 1, which contains a polyester (3) in which the alcohol component is propylene glycol-(1,2) or neopentyl glycol.

14. A composition according to claim 1, which contains an acid polyester of formula (II) 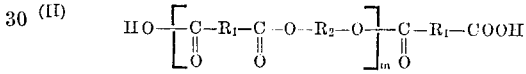

wherein $R_1$ denotes the hydrocarbon residue of a member of the group consisting of unsaturated aliphatic-cycloaliphatic dicarboxylic acid which has been manufactured by dimerization of unsaturated monomeric fatty acids having 14 to 24 carbon atoms in the molecule, said saturated aliphatic-cycloaliphatic dicarboxylic acid which has been manufactured by dimerization of unsaturated monomeric fatty acid having 14 to 24 carbon atoms in the molecule, subsqeuent hydrogenation of such a dimeric fatty acid, $R_2$ denotes a residue of an aliphatic diol obtained by separating off the two hydroxyl groups, and $m$ denotes an integer from 1 to 20.

15. A composition according to claim 2, which contains an acid polyester of formula (II) 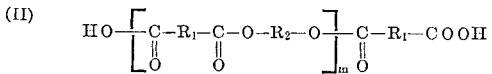

wherein $R_1$ denotes the hydrocarbon residue of a member of the group consisting of unsaturated aliphatic-cycloaliphatic dicarboxylic acid which has been manufactured by dimerization of unsaturated monomeric fatty acids having 14 to 24 carbon atoms in the molecule, said saturated aliphatic-cycloaliphatic dicarboxylic acid which has been manufactured by dimerization of unsaturated monomeric fatty acid having 14 to 24 carbon atoms in the molecule, and subsequent hydrogenation of such a dimeric fatty acid, $R_2$ denotes a residue of an aliphatic diol obtained by separating off the two hydroxyl groups, and $m$ denotes an integer from 2 to 6.

16. A composition according to claim 1, which contains a polyester, containing hydroxyl groups, of formula (III) 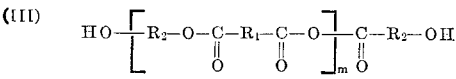

wherein R denotes the hydrocarbon residue of a member of the group consisting of unsaturated aliphatic-cycloaliphatic dicarboxylic acid which has been manufactured by dimerization of unsaturated monomeric fatty acids having 14 to 24 carbon atoms in the molecule, and saturated aliphatic-cycloaliphatic dicarboxylic acid which has been manufactured by dimerization of unsaturated monomeric fatty acid having 14 to 24 carbon atoms in the molecule, and subsequent hydrogenation of such a dimeric fatty acid, $R_2$ denotes the residue of an aliphatic diol, and $m$ denotes an integer from 1 to 20.

17. A composition according to claim 2, which contains a polyester, containing hydroxyl groups, of formula (III)

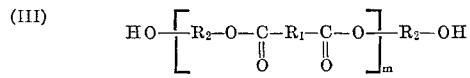

wherein R denotes the hydrocarbon residue of a member of the group consisting of unsaturated aliphatic-cycloaliphatic dicarboxylic acid which has been manufactured by dimerization of unsaturated monomeric fatty acids having 14 to 24 carbon atoms in the molecule, and saturated aliphatic-cycloaliphatic dicarboxylic acid which has been manufactured by dimerization of unsaturated monomeric fatty acid having 14 to 24 carbon atoms in the molecule, and subsequent hydrogenation of such a dimeric fatty acid, $R_2$ denotes the residue of an aliphatic diol, and $m$ denotes an integer from 1 to 20.

18. A composition according to claim 1, which contains a polycarboxylic acid anhydride (2) of formula (IV)

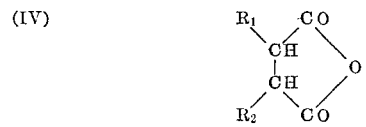

wherein $R_1$ and $R_2$ each denote a hydrogen atom, an alkyl residue, an alkenyl residue, or together, denote a divalent residue which is necessary for completing a carbocyclic ring.

19. A composition according to claim 18, which contains dodecenylsuccinic anhydride as the polycarboxylic acid anhydride (2).

References Cited

UNITED STATES PATENTS

| | | | |
|---|---|---|---|
| 3,031,434 | 4/1962 | Radlove | 260—78.4 |
| 3,036,023 | 5/1962 | Rodgers et al. | 260—2.5 |
| 3,098,052 | 7/1963 | Schmitz et al. | 260—22 |
| 3,278,636 | 10/1966 | Wynstra | 260—835 |
| 3,390,108 | 6/1968 | Keck et al. | 260—75 |
| 3,468,704 | 9/1969 | Graver | 260—22 |

FOREIGN PATENTS

| | | | |
|---|---|---|---|
| 441,752 | 1/1968 | Switzerland | 260—75 |

HOSEA E. TAYLOR, Primary Examiner

R. W. GRIFFIN, Assistant Examiner

U.S. Cl. X.R.

117—161; 260—40